(12) United States Patent
Müller et al.

(10) Patent No.: US 10,875,934 B2
(45) Date of Patent: Dec. 29, 2020

(54) NANOCRYSTALLINE CELLULOSE, ITS PREPARATION AND USES OF SUCH NANOCRYSTALLINE CELLULOSE

(71) Applicant: TECHNISCHE UNIVERSITÄT MÜNCHEN, Munich (DE)

(72) Inventors: Vesna Müller, Vaterstetten (DE); Heiko Briesen, Freising (DE)

(73) Assignee: TECHNISCHE UNIVERSITÄT MÜNCHEN, München (DE)

( * ) Notice: Subject to any disclaimer, the term of this patent is extended or adjusted under 35 U.S.C. 154(b) by 613 days.

(21) Appl. No.: 15/517,779

(22) PCT Filed: Oct. 9, 2015

(86) PCT No.: PCT/EP2015/073438
§ 371 (c)(1),
(2) Date: Apr. 7, 2017

(87) PCT Pub. No.: WO2016/055632
PCT Pub. Date: Apr. 14, 2016

(65) Prior Publication Data
US 2017/0306056 A1     Oct. 26, 2017

(30) Foreign Application Priority Data

Oct. 10, 2014  (EP) .................................. 14188526

(51) Int. Cl.
| | | |
|---|---|---|
| C08B 15/08 | (2006.01) | |
| C01G 3/02 | (2006.01) | |
| C01G 9/02 | (2006.01) | |
| C01G 45/02 | (2006.01) | |
| C01G 1/02 | (2006.01) | |

(52) U.S. Cl.
CPC ................ *C08B 15/08* (2013.01); *C01G 1/02* (2013.01); *C01G 3/02* (2013.01); *C01G 9/02* (2013.01); *C01G 45/02* (2013.01); *C01P 2006/16* (2013.01)

(58) Field of Classification Search
None
See application file for complete search history.

(56) References Cited

U.S. PATENT DOCUMENTS

| | | | |
|---|---|---|---|
| 2004/0053887 A1* | 3/2004 | Obae | .................... A61K 9/2054 514/57 |
| 2012/0135505 A1* | 5/2012 | Frangioni | ............... C08B 15/02 435/277 |
| 2013/0089492 A1 | 4/2013 | Maclachlan et al. | |

FOREIGN PATENT DOCUMENTS

WO    WO 2014/029001 A1    2/2014

OTHER PUBLICATIONS

Liu, Preparation and Morphology of Nanocrystalline Cellulose from Bamboo Pulp, Proceedings of the 55th International Convention of Society of Wood Science and Technology Aug. 27-31, 2012. (Year: 2012).*
Brinchi, L. et al., "Production of Nanocrystalline Cellulose from Lignocellulosic Biomass: Technology and Applications." *Carbohydrate Polymers*, Jan. 2013, 94:154-169, doi: 10.1016/j.carbpol.2013.033.
Dong, X.M., Grey, D.G., "Effect of Counterions on Ordered Phase Formation in Suspensions of Charged Rodlike Cellulose Crystallites." *Langmuir*, Feb. 1997, 13:2404-2409, doi: 10.1021/la960724h.
Dujardin, E., et al., "Synthesis of Mesoporous Silica by Sol-Gel Mineralisation of Cellulose Nanorod Nematic Suspensions." *J. Mat. Chem.*, Feb. 2003, 13:696-699, doi: 10.1039/b212689c.
Shopsowitz, K.E. et al., "Free-Standing Mesoporous Silica Films with Tunable Chiral Nematic Structures." *Letter*, Nov. 2010, 468:422-426, doi: 10.1038/nature09540.

* cited by examiner

*Primary Examiner* — Layla D Berry
(74) *Attorney, Agent, or Firm* — Saliwanchik, Lloyd & Eisenschenk

(57) ABSTRACT

The present invention relates to nanocrystalline cellulose, an efficient way of its preparation and to uses of such nanocrystalline cellulose. The present invention also relates to porous metal oxides having a chiral nematic structure which are prepared using nanocrystalline cellulose.

12 Claims, 11 Drawing Sheets

ZnO 5g 3xcentrifuged

ZnO 5g 4xcentrifuged

ZnO 5g 5xcentrifuged

ZnO 10g 3xcentrifuged

ZnO 10g 4xcentrifuged

ZnO 10g 5xcentrifuged

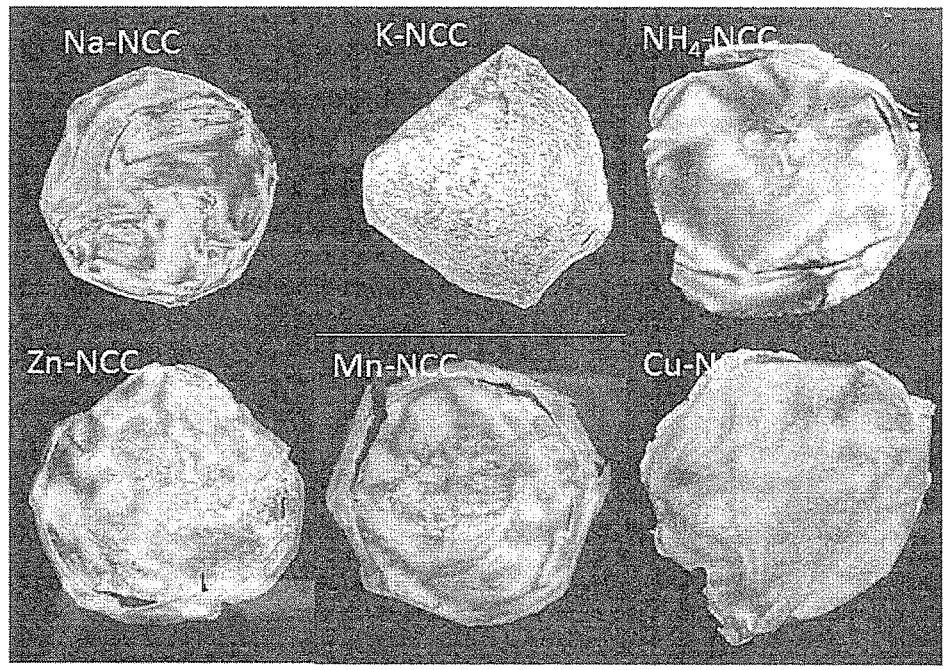
Figure 14
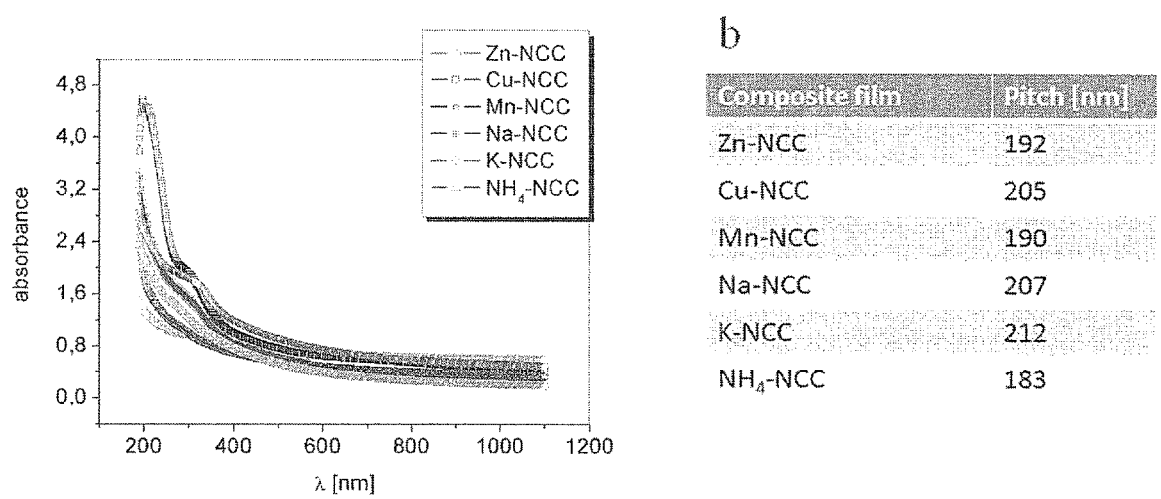
Figure 15 a and b

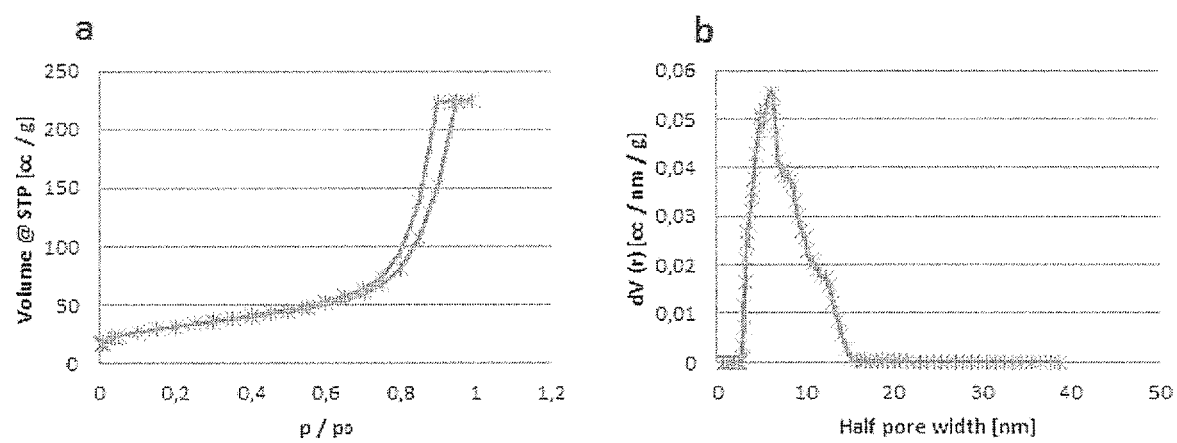
Figure 16 a and b

NANOCRYSTALLINE CELLULOSE, ITS PREPARATION AND USES OF SUCH NANOCRYSTALLINE CELLULOSE

CROSS REFERENCE TO A RELATED APPLICATION

This application is a National Stage Application of International Application Number PCT/EP2015/073438, filed Oct. 9, 2015; which claims priority to European Patent Application No. 14188526.9, filed Oct. 10, 2014; both of which are incorporated herein by reference in their entirety.

The present invention relates to nanocrystalline cellulose, an efficient way of its preparation and two uses of such nanocrystalline cellulose. The present invention also relates to porous metal oxides having a chiral nematic structure which are prepared using nanocrystalline cellulose.

More specifically the present invention relates to a method of preparing nanocrystalline cellulose, to a nanocrystalline cellulose prepared by such method, and to uses of such nanocrystalline cellulose. The present invention also relates to a method for preparing a porous metal oxide with a chiral nematic structure and to a porous metal oxide prepared by such method.

Nanocrystalline cellulose (NCC) is a material which has recently gained an enormous interest from the industry and academia. It has a wide range of interesting properties and many possible applications. For example, the specific Young's modulus of nanocrystalline cellulose is approximately 2.5 times that of stainless steel, as a result of which nanocrystalline cellulose is widely investigated as a reinforcement/filler material. Nanocrystalline cellulose is completely non-toxic and bio-compatible and therefore also has received a lot attention in the pharmaceutical industry as a substrate/matrix material for implants and/or drug delivery systems. It is furthermore interesting as a food additive or in non-toxic food packaging food material. Nanocrystalline cellulose crystals are birefringent in aqueous suspension which makes nanocrystalline cellulose also interesting from an optical point of view. Although nanocrystalline cellulose is an industrially promising material, its manufacture remains non-trivial and expensive. Current preparation procedures for nanocrystalline cellulose typically are based on acidic hydrolysis of cellulose fibers from any desired cellulose source. The preparation procedure consists of exposure of a cellulose source material, i.e. cellulose fibers, to strong acid under controlled conditions, and at the end the hydrolysis is stopped by diluting the suspension with large amounts of water. The isolated nanocrystalline cellulose is further purified from the acid through elaborated and time-consuming procedures which involve, inter alia, dialysis against distilled water and require typically several days. Also, the yield of the currently employed preparation procedures is low and usually does not exceed 20%.

Porous inorganic solids with a chiral nematic structure have increasingly received attention over the last decade. These materials having a pore size in the range from 2 nm to 50 nm have a huge surface area and provide a tunable reflectivity of light as a result of the tunable pitch in their chiral nematic structure. The presence of chirality offers a possibility for incorporation or separation of chiral molecules from a mixture or enantiomeres. Porous inorganic solids are also used as sensor materials, tunable reflective filters, stereo-selective separation materials or stereo-selective catalysts. The preparation of these porous inorganic materials, however, remains a formidable task. One example of such porous inorganic solids are porous oxides with a controlled pore size and a periodical ordering of the pores. One of the general methods for their preparation is based on a sol-gel synthesis, using a templating method. In such templating method, metal oxide precursors are mixed together in a solvent, such as water or alcohol with a template, such as mesoporous carbon, mesoporous silica, silica beads, polymethyl methacrylate (PMMA) spheres, amphiphilic bloc-copolymers or surfactants. The template can be hard or soft, and the sol obtained from the metal oxide precursors assembles around the template and condenses into a gel network upon removal of the excess amount of solvent. A transformation of the network into oxide and removal of the template is performed by a subsequent annealing at elevated temperature in air.

Although, by using this method, it is possible to prepare porous oxides with a highly ordered pore structure, a chiral nematic ordering has, so far not been obtained with this general template-base method. Various research groups have therefore tried to prepare porous oxides having a chiral nematic structure by templating with a template which is itself chiral nematic. Dujardin et al., 2003, Journal of Materials Chemistry, 13, pp. 696-699, showed for the first time the use of nanocrystalline cellulose as a chiral nematic template for the preparation of porous silica. Prior to the actual templating process, the authors isolated nanocrystalline cellulose from commercial cellulose through an elaborated procedure. Thereafter, they templated the silica on the nanocrystalline cellulose, but unfortunately, no clear evidence of interfibrillar order was presented. Thomas et al., 2003, Advanced Functional Materials, 13, pp. 763-766, prepared silica with a chiral structure by templating with commercial hydroxypropyl cellulose. These methods were further developed in the studies of Shopsowitz et al., 2010, Nature, 468, pp. 422-425, who used nanocrystalline cellulose as a template and managed to prepare colored free standing silica films with a long range chiral nematic ordering. Ivanova et al., 2014, Journal of the America Chemical Society, 136, pp. 5930-5937, have used a pre-prepared nanocrystalline cellulose and used this isolated pre-prepared nanocrystalline cellulose to template a titania ($TiO_2$) sol-gel solution thereon. Altogether, the preparation of chiral nematic metal oxides has so far remained an arduous task, given that it required the preparation of a suitable template first, its isolation and the subsequent use thereof for templating.

Accordingly, in a first aspect, an object of the present invention was to provide for an efficient way of preparing nanocrystalline cellulose without significant loss of the product. According to this first aspect, it was also an object to provide for a nanocrystalline cellulose which is versatile and the qualities of which can be fine-tuned depending on the intended application of such nanocrystalline cellulose.

In a second aspect, it was an object of the present invention to provide for a preparation methodology of a porous metal oxide having chiral nematic structure which methodology is easy to perform and does not require complicated multi-stage processes.

The object of the first aspect is solved by a method of preparing nanocrystalline cellulose, comprising the steps:
a) Providing cellulose fibers,
b) Subjecting said cellulose fibers to an acidic hydrolysis;
c) Stopping the hydrolysis by addition of a base.

In one embodiment, the method comprises the further step:
d) Isolating the nanocrystalline cellulose resulting from the performance of steps b)-c).

In one embodiment, isolating the nanocrystalline cellulose in step d) is achieved by centrifugation and washing.

In one embodiment, step d) is achieved by performing a first centrifugation on the product of step c), followed by a washing step and a further centrifugation step.

In one embodiment, the washing step and the further centrifugation step are performed n-times, wherein n=1-10, preferably 1-5.

In one embodiment, said hydrolysis in step b) is performed by the presence of a mineral acid, preferably sulfuric acid.

In one embodiment, said base that is added in step c) is selected from the group comprising metal hydroxides, metal oxides and $NH_3$.

In one embodiment, said hydrolysis in step b) is performed by the presence of a mineral acid, and wherein said base is
i) a metal hydroxide or $NH_3$, and wherein said metal hydroxide or $NH_3$ is added in step c) in a molar ratio of base:mineral acid in a range of from 1:10 to 10:1, preferably 1:5 to 5:1, more preferably 1:2 to 2:1 and even more preferably approximately 1:1, or
ii) a metal oxide, wherein said metal oxide in step c) is added in a molar ratio of metal oxide:mineral acid in a range of from approximately 1:10 to 1:1, preferably from approximately 1:3 to 1:1.

In one embodiment, said metal hydroxide is an alkali metal hydroxide or an earth alkali metal hydroxide or a metal hydroxide selected from $Al(OH)_3$, $Zn(OH)_2$, $Mn(OH)_2$ and $Cu(OH)_2$, and wherein said metal oxide has a general formula selected from $MeO$, $MeO_2$ and $Me_2O_3$, wherein Me=metal and O=oxygen.

The objects of the first aspect of the invention are also solved by a nanocrystalline cellulose prepared by the method according to the present invention.

The objects of the first aspect of the invention are also solved by a nanocrystalline cellulose prepared by the method according to the present invention, wherein said base is a metal oxide or metal hydroxide, and/or characterized by:
a content of metal ions, wherein preferably said content of metal ions is in the range of from 10 mg/g of sample nanocrystalline cellulose to 800 mg/g of sample nanocrystalline cellulose, preferably from 20 mg/g to 500 mg/g of sample nanocrystalline cellulose, more preferably from 40 mg/g to 400 mg/g of sample nanocrystalline cellulose.

The content of metal ions in the nanocrystalline cellulose is determined by ion chromatography measurements. More specifically, the content of metal ions, measured as mass concentration (in mg/l) is determined as the area under the peak(s) of the respective metal ions.

This can then be recalculated in mg metal ions per g of the nanocrystalline cellulose (NCC) using the equations shown further below in Example 4 under "Calculations", in particular equations (1) and (2).

In one embodiment, said nanocrystalline cellulose is further characterized by
a chiral nematic structure, and
a left handed pitch in the range of from 0.1 μm to 1 μm, preferably from 0.3 μm to 0.6 μm.

The pitch, as used herein, is measured based on UV/VIS spectra-measurements of a dried sample using the Vries' expression:

$$\lambda_{max} = n_{avg} P,$$

wherein $\lambda_{max}$ is the peak wavelength determined in a UV/VIS spectrum, and $n_{avg}$ is the refractive index of the respective material, e. g. cellulose, and P is the helical pitch. Using the refractive index of cellulose $n_{avg}$ as 1.54 and measuring the peak wavelength of the respective sample, it is possible to calculate the helical pitch from such UV/VIS spectra-measurements.

It should be noted that the pitch of nanocrystalline cellulose is always left-handed.

The objects of the first aspect of the invention are also solved by the use of the nanocrystalline cellulose according to the present invention,
as a substrate, matrix or coating in electronic and pharmaceutical applications,
as an additive in paper or food,
as a coating in medical and pharmaceutical applications, for example a wound dressing or for the preparation of artificial blood vessels, or
as a reinforcing agent/filler for enhancement of mechanical strength, e.g. in composite materials.

The objects of the second aspect of the present invention are also solved by a method for preparing a porous metal oxide with chiral nematic structure, comprising the steps:
a') performing the method of preparing nanocrystalline cellulose, as defined above, wherein the base that is used is a metal oxide or metal hydroxide,
b') casting the resultant nanocrystalline cellulose in any desired three-dimensional shape or as a thin film, wherein, preferably, said thin film has a thickness in the range of from 50 nm to 500 μm, more preferably from 100 nm to 30 μm,
c') subjecting said casted shape or thin film to a heat treatment for annealing and for removal of the nanocrystalline cellulose, said heat treatment thus resulting in a porous metal oxide with chiral nematic structure.

In one embodiment, said film of nanocrystalline cellulose is on a substrate, such as glass, or is between two substrates, such as two polarizers. In one embodiment, such film has a thickness of from 400 nm to 3 μm or from 400 nm to 1 μm. It is, however, also possible to obtain thicker films, such as in the range of from 15 μm to 30 μm. Other thickness ranges are also possible such as 50 μm to 100 nm, or 50 nm to 3 μm, or 100 nm to 3 μm, or 100 nm to 1.5 μm. Thin films can be prepared by any appropriate technique, such as spin coating, drop coating, doctor blonding, Langmuir-Blodgett-technique, dip coating and the like. The films may be dried after preparation.

Also encompassed by the invention are films of metal oxide as prepared by the method of the present invention. In one embodiment, such films of metal oxide according to the present invention have an average thickness in the range of from 50 nm to 5 μm, preferably 100 nm to 3 μm or 100 nm to 1.5 μm. Thicker metal oxide films are, however, also possible and may be in the μm-range, e.g. 1 μm to 100 μm.

The objects of the second aspect of the invention are also solved by a porous metal oxide prepared by the method for preparing a porous metal oxide as defined above, and preferably wherein said porous metal oxide is characterized by an average pore size in the range of from 2-50 nm and/or having a chiral nematic structure mimicking the chiral nematic structure of the nanocrystalline cellulose as defined above.

The porosity and the average pore size is investigated and determined by the analysis of adsorption isotherms of $N_2$ at 77K. As used herein, the term "average pore size" refers to the half pore width as determined by the analysis of adsorption isotherms of $N_2$ at 77K, preferably using a non-local density functional theory (NLDFT) model for silica with cylindrical pores. Such calculations can typically be performed using the software on the device with which the measurements of the adsorption isotherms are performed.

Regarding the first aspect, the inventors have surprisingly found that the preparation of chiral nematic nanocrystalline cellulose can be made much more efficient both in terms of required time and achieved yield, when the acidic hydrolysis which is used to hydrolyze the cellulose source material, is stopped by quenching through the addition of a base. In one embodiment, this base is not water, preferably not distilled water. Typically, the base is added to the hydrolysis reaction directly and without any intervening washing steps before the addition of said base. Optionally, in some instances where the viscosity of the product resulting from the hydrolysis reaction is too high, before the addition of the base, the viscosity of the reaction may be adjusted by adding water such that the resultant volume of the reaction is, at a maximum, three times the volume of the reaction of step b), i.e. of the hydrolysis step.

Step c), according to the present invention, is not performed by repeated dilutions using water, in particular distilled water, and/or repeated washing steps using water, in particular distilled water. The method according to the present invention also does not require or employ one or several dialysis steps, thus dramatically shortening the required time. In one embodiment, step c) is performed immediately after step b) has been allowed to proceed for a sufficient amount of time. Typical durations of the hydrolysis reaction (step b)) range from 1 h-24 h, preferably 1 h-10 h, more preferably 1 h-5 h. In one embodiment, step b) i.e. the acidic hydrolysis reaction is performed at a temperature in the range of from 30° C.-95° C., preferably 30° C.-90° C. For example, the hydrolysis reaction may be performed at a temperature of 30° C., 35° C., 40° C., 45° C., 50° C., 55° C., 60° C., 65° C., 70° C., 75° C., 80° C., 85° C., 90° C. and values in between these mentioned values. In one embodiment, the base which is added instead of c) is not a carbonate, more specifically not sodium carbonate or a sodium carbonate solution. In one embodiment, the performance of step c) does not lead to a formation of insoluble sulfate (i. e. insoluble in aqueous solution) or to a precipitation of sulfate.

According to embodiments of the present invention, the hydrolysis of step b) is not terminated by dilution of the acid and subsequent dialysis using water, in particular distilled water. Rather, the acidic hydrolysis is stopped by the direct addition of a base.

Cellulose fibers which are typically used as a starting material in step a) according to the method of the present invention may be derived from a variety of cellulose sources, such as, but not limited to, cellulose material from plants in general, e.g. cotton, ramie, hemp, flax, sisal, wheat, straw, palm, wood pulp, cotton linters pulp, sugar beet pulp, bacterial cellulose, hard wood, soft wood, paper, wood shavings, sawdust, forest trimmings, corn stover, corn cobs, corn fiber, straw, in particular wheat straw, barley straw, rice straw, sugar cane bagasse, switch grass, empty fruit bunches from palm oil trees/residues, forest tree thinnings, any sort of native or non-native grass, energy crops and agricultural residues.

The inventors have managed to improve the preparation of nanocrystalline cellulose (NCC) in that, according to their method, the time required for production is dramatically shortened due to the absence of any dialysis steps, and there is also not a significant loss of the product. Typical yields according to the present invention are 80-95%. This is as opposed to the prior art processes, where product yields were rather low and typically around 20% at a maximum. The inventors have found that through the addition of a base at the end of the hydrolysis process, the hydrolysis is stopped by a neutralization between the negatively charged sulfuric anions and the positively charged base cations. In one embodiment, such neutralization reaction in step c) follows the equation:

$$2MeOH_{(aq.)} + H_2SO_{4(aq.)} \rightarrow 2Me^+ + SO_4^{2-} + H_2O,$$

wherein Me is a metal, preferably an alkali metal. It should be noted that the neutralization reaction does not lead to a precipitation of the sulfate.

Similar equations can be formulated for earth alkali metal hydroxides or other metal hydroxides such as $Al(OH)_3$, $Zn(OH)_2$, $Mn(OH)_2$ and $Cu(OH)_2$.

In another embodiment, a similar neutralization can be achieved using metal oxides which react with sulfuric acid leading to the same type of neutralization reaction. In one embodiment, this neutralization using metal oxides follows one of the following equations:

$$MeO + H_2SO_{4(aq.)} \rightarrow M^{2+} + SO_4^{2-} + H_2O$$

$$MeO_2 + 2H_2SO_{4(aq.)} \rightarrow M^{4+} + 2SO_4^{2-} + 2H_2O.$$

$$Me_2O_3 + 3H_2SO_{4(aq.)} \rightarrow 2Me^{3+} + 3SO_4^{2-} + 3H_2O.$$

In a preferred embodiment, the base that is added in step c) is selected from the group comprising metal hydroxides, metal oxides and $NH_3$. In one embodiment, the metal hydroxide is an alkali metal hydroxide, in particular NaOH, KOH, or LiOH. In another embodiment, the metal hydroxide is an earth alkali metal hydroxide or a metal hydroxide selected from $Al(OH)_3$, $Zn(OH)_2$, $Mn(OH)_2$ and $Cu(OH)_2$. In one embodiment, the base that is added in step c) does not form insoluble salts with sulfate anions and does not precipitate sulfate in aqueous solution. In one embodiment, the base does not contain Ba, Ca, Pb, Hg, Ra, Ag, Sr. In one embodiment, the metal oxide that is added as base in step c) has a general formula selected from MeO, $MeO_2$, and $Me_2O_3$. In one embodiment, Me in the metal oxide is selected from the group comprising Zn, Fe, Cu, Mn, Cu, Ti, Cr, Mo, Ag, Cd, W, Rh, Os, Pt, Au, Al, Ga, In, Sn, Pb, and Bi. When the acidic hydrolysis reaction of step b) is thus stopped in accordance with step c) by addition of a base, this will result in a nanocrystalline cellulose which has metal, in the form of metal cations-, attached. The amount of such metal cations that is attached to the nanocrystalline cellulose can be tuned either by adjusting the amount of base that is added in step c), preferably the amount of metal hydroxide or metal oxide, or by performing a subsequent washing procedure. Typical values obtained for the amount of metal ions lie in the range of from 10 mg/g of sample NCC to 800 mg/g of sample NCC, preferably from 20 mg/g to 500 mg/g of sample NCC, more preferably from 40 mg/g to 400 mg/g of sample NCC. Typically, the addition of the base will lead to an isolation of the nanocrystalline cellulose which typically adopts a jelly-like texture/structure. The jelly-like structure which represents the nanocrystalline cellulose is further isolated by an appropriate isolation measure, such as centrifugation. The nanocrystalline cellulose thus collected may subsequently be washed by adding some amount of solvent, preferably water, to the nanocrystalline cellulose, this is then mechanically agitated, i.e. the nanocrystalline cellulose plus the water, and the nanocrystalline cellulose subsequently isolated, e.g. by centrifugation. This will result in a liquid supernatant phase which is discarded while the remaining solid, jelly-like part, contains the nanocrystalline cellulose. If necessary, this washing and isolation procedure can be repeated as many times as desired, and this repetition also defines the amount of metal that is present in the nanocrystalline cellulose. The resultant nanocrystalline cellulose structure has a chiral nematic structure and shows a typical birefringent iridescent appearance. The type of iridescence birefringence, in particular the wavelength depends on the amount of metal ions and/or metal oxide associated with the nanocrystalline cellulose crystals. Without wishing to be bound by any theory, the present inventors believe that the pitch of the chiral nematic phase is influenced by the presence and the amount of metal ions. Since the nano crystalline cellulose bears negatively charged sulfuric anions, the presence of metal cations in its surrounding packs the nanocrystalline cellulose whiskers or fibrils more close together, and this behavior allows a more dense packing which, in turn, leads to a decrease of the pitch. The configuration of the nanocrystalline cellulose is an assembly of nanocrystalline cellulose fibrils which are stacked in planes, wherein, within one plane, all nanocrystalline cellulose fibrils are aligned in one direction. The direction of each plane is left-handed rotated around the chiral nematic axis. The distance of the plane stacks where the nanocrystalline cellulose fibrils from a first plane and the nanocrystalline cellulose fibrils from a further plane have the same direction is also herein referred to as "pitch". Hence, this is the distance over which the direction of the fibrils undergoes a 360° twist. The pitch of the nanocrystalline cellulose in accordance with the present invention can be controlled by influencing the amount or the type of metal ions that are associated with the nanocrystalline cellulose. This can be determined by the total amount of base that is used in step c) and/or the subsequent manipulation of the nanocrystalline cellulose that is obtained when the hydrolysis has been stopped. For example by employing a washing step, the amount of metal can be decreased, and the more washing steps are employed, the more the amount of metal ions can be decreased. For example, typical values for metal ion content obtained in dependence on the number of washing steps are 300-380 mg/g of sample NCC for three washing steps, 100-150 mg/g of sample NCC for four washing steps, and 40-50 mg/g of sample NCC for five washing steps. Typically, for isolating the nanocrystalline cellulose in step d), a washing step is followed by a further centrifugation step, wherein the resultant supernatant is discarded and the sediment, i.e. the nanocrystalline cellulose is the resultant solid phase. Preferably, the washing step and the further centrifugation step are performed wherein n=1-10, preferably =1-5. Hence, by a repetition of the washing and further centrifugation step, the pitch of the chiral nematic structure of the nanocrystalline cellulose can be directly influenced. Again, without wishing to be bound by any theory, the present inventors believe that this is a result of the change of concentration of the metal ions or metal oxide in the dispersion which decrease with each subsequent washing (and centrifugation) procedure. Likewise, the wavelenght of iridescence in solid nanocrystalline cellulose films can be controlled by stopping the washing procedure at any desired point and to use such solution for the preparation of nanocrystalline cellulose films. The nanocrystalline cellulose in accordance with the present invention is thus characterized by an amount of metal, typically in the form metal ions, associated with the nanocrystalline cellulose, which amount or content preferably is in the range of from 10 mg/g of sample NCC to 800 mg/g of sample NCC, preferably from 20 mg/g to 500 mg/g of sample NCC, more preferably from 40 mg/g of sample NCC to 400 mg/g of sample NCC. Accordingly, the objects of the first aspect of the present invention are also solved by a nanocrystalline cellulose prepared in accordance with the method according to the present invention. The nanocrystalline cellulose can be used to prepare films by applying a solution/dispersion of such nanocrystalline cellulose in water on a substrate and by letting this dry. The nanocrystalline cellulose of the present invention is thus different from the nanocrystalline cellulose of the prior art, which does not have any metal ions present due to the repeated dilution and dialysis steps used for its production. In contrast thereto, the NCC according to the present invention is characterized by the presence of metal ions.

According to the above-mentioned second aspect of the invention, the present inventors have also surprisingly found that the use of a metal oxide or metal hydroxide as base to stop the hydrolysis of the cellulose in step c) results in a nanocrystalline cellulose dispersion which can be used directly for the preparation of a porous metal oxide. In other words, according to this aspect of the present invention, this method is a one-pot-preparation for preparing nanocrystalline cellulose and for subsequently or concomitantly preparing a composite material comprising both nanocrystalline cellulose and metal oxide. Accordingly, the present invention is also directed at a nanocrystalline cellulose-metal oxide-composite material. The nanocrystalline cellulose-metal oxide-composite can be cast into a film or any other three-dimensional shape, and can be either used as such or subjected subsequently to a heat treatment. This heat treatment serves the purpose of annealing and of removing the nanocrystalline cellulose as a result of which the nanocrystalline cellulose is removed and a porous metal oxide is produced, said porous metal oxide having a chiral nematic structure. The present inventors have surprisingly found that it is possible to prepare nanocrystalline cellulose first and immediately, i.e. within the same reaction in the same vessel, use this for a subsequent production of a nanocrystalline cellulose-metal oxide-composite material, from which a porous metal oxide having a chiral nematic structure can be easily prepared by a simple heat treatment. Again without wishing to be bound by any theory, the present inventors believe that the presence of metal ions in the nanocrystalline cellulose dispersion allows the separation of the nanocrystalline cellulose, while, at the same time, the resultant dispersion can be used for the preparation of a nanocrystalline cellulose-metal oxide-composite material which, in turn, can be subjected to a further annealing step which results in a porous metal oxide having a chiral nematic structure. By defining the type and amount/content of the metal ions in the dispersion, by defining which and how much metal oxide or metal hydroxide is used for neutralization purposes in step c) and by applying washing procedures (which remove some of the metal ions), the overall content/amount of metal can be influenced which has a direct influence on the structure of the composite material and on the resultant porous metal oxide as well.

In the following, reference is made to the figures wherein

FIG. 1 shows dispersions of the NCC crystallites in water viewed between cross polar filters. In the figure panel a) is the NCC dispersion prepared at 45° C., panel b) is the dispersion prepared at 60° C., and panel c) is the dispersion prepared at 70° C.

FIG. 2 shows images of the films of dried droplets of NCC dispersion on microscopic glass slides. The images a-d were taken at 90° and images e-h were taken at higher angles. In the figure, panels a) and e) are the film made from sample which was prepared at 45° C., panels b) and f) are the film made from sample which was prepared at 50° C., panels c) and g) are the film made from sample which was prepared at 60° C., and panels d) and h) are the film made from sample which was prepared at 70° C. These exemplary films have an average thickness of from 400 nm to 3 µm, or from 400 nm to 1 µm.

FIG. 3 shows microscope images of the dried NCC films obtained between crossed polarizers. Arrows indicate a typical liquid crystalline structure which was preserved in dried NCC films. FIG. 3a) shows a film obtained from the NCC nanoparticles prepared at 45° C., figure b) at 50° C., figure c) at 60° C. and figure d) at 70° C. Average film thickness of exemplary films is from 400 nm to 3 µm, or from 400 nm to 1 µm.

FIG. 4 shows XRD patterns of the NCC films made from the NCC dispersions which were washed five times. The average film thickness of exemplary films is from 15 µm to 30 µm.

FIG. 5 shows dispersions of NCC directly after the neutralization with metal oxides. From the left to the right: NCC dispersion neutralized with 5 g of ZnO, NCC dispersion neutralized with 4.96 g of CuO and NCC dispersion neutralized with 4.3 g of MnO. The greenish-blue color of the mixture of NCC dispersion indicates the formation of copper sulfate. Accordingly, pastel rose color of the Mn mixture indicates formation of manganese sulfate.

FIGS. 6, 7, 8 show NCC composites for different amounts of precursor, i.e. of metal oxide. The columns show different degrees of washing and centrifugation. The rows show the indicated amounts of precursors, i.e. metal oxides, used for neutralization. FIG. 6, 7, 8 show the results for ZnO, CuO and MnO, respectively.

FIG. 9 shows microscopic images of a ZnO—NCC composite before and after annealing of the composite. The columns show different degrees of washing and centrifugation. The rows show the state before (up) and after (down) annealing at 450° C. for 3 h. Images were taken between cross polarized filters.

FIG. 10 shows dip-coated Mn-Oxide films after annealing at 450° C. for 3 h. From left to right the different samples show a difference in color due to a change in concentration of Mn ions. Average film thickness of exemplary metal oxide films is from 100 nm to 1.5 µm.

FIG. 11 shows the appearance of the "end product" after the washing procedure. Figures a and b show the appearance of the dispersion and its gel-like properties indicated by placing the bottle up-side-down. Figures c and d show appearance of the dispersion placed between crossed polarized filters. In the figure d can be seen the preservation of the iridescence birefringence in the gel-like product (bottle is placed up-side-down).

FIG. 14 shows NCC films observed between cross polarizers showing iridescence birefringence.

FIG. 15a shows UV-Vis spectra of the different NCC composite films where arrow indicates the observed shoulder in the absorbance. b The calculated values of the helical pitch for the chiral nematic ordering of NCC in the composite films by using Vries' equation and the UV-Vis data.

FIG. 16a shows adsorption and desorption isotherm. b Pore size distribution obtained from adsorption isotherm by applying a NLDFT calculation model for silica with cylindrical pores.

Furthermore, reference is made to the following specific description and examples which are given to illustrate, not to limit the present invention:

Example 1

Preparation of Nanocrystalline Cellulose in Accordance with Embodiments of the Present Invention The current prior art preparation procedure of nanocrystalline cellulose (NCC) is based on acidic hydrolysis of the cellulose source and usually leads to a maximal yield of ca. 20%. Additionally further purification of the crystallites from the resins of sulfuric acid is based on time consuming dialysis process.

Within embodiments of the present invention, the present inventors have changed the synthesis procedure in the way that it allows a separation of cellulose nanocrystals from solution without significant loss of the product. Yields obtained according to the present invention are 80%-95%. This is achieved by direct addition of a desired base at the end of the hydrolysis process and exclusion of repeated dilution and dialysis steps using water. In certain embodiments, the base is added in equimolar amount to the sulfuric acid which was used in the hydrolysis. When the base is e.g. an alkali metal hydroxide, addition of the base leads to a neutralization process between the negatively charged sulfuric anions and positively charged base cations according to the equation:

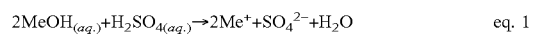

$$2MeOH_{(aq.)} + H_2SO_{4(aq.)} \rightarrow 2Me^+ + SO_4^{2-} + H_2O \qquad \text{eq. 1}$$

and stops the hydrolysis reaction.

The presence of the cations in the dispersion allows the separation of cellulose nanocrystals by simple centrifugation without significant loss of the product. After the centrifugation of NCC crystals from the neutralized dispersion, the upper liquid part is discarded, and the lower jelly like part is diluted with water and left for stirring for ca. 15 minutes in order to wash out salt ions. This is followed by another centrifugation. The repetition of the whole washing process up to three times leads to the yield of separated NCC particles of approximately 90% of the starting materials. Depending on the desired purity of the NCC crystals, the washing process can be repeated.

Figure 1:
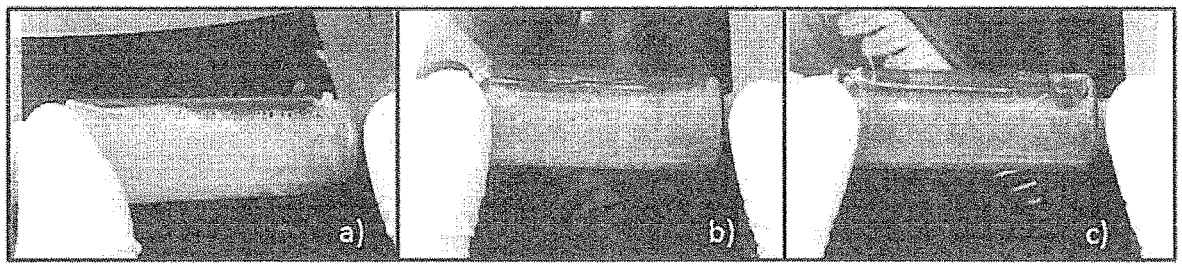

The final obtained dispersions of NCC can be diluted to the desired concentration of NCC nanoparticles in the solvent. The dispersions, placed between the crossed polar filter, show typical iridescent birefringence patterns, see also FIG. 1.

Figure 2:
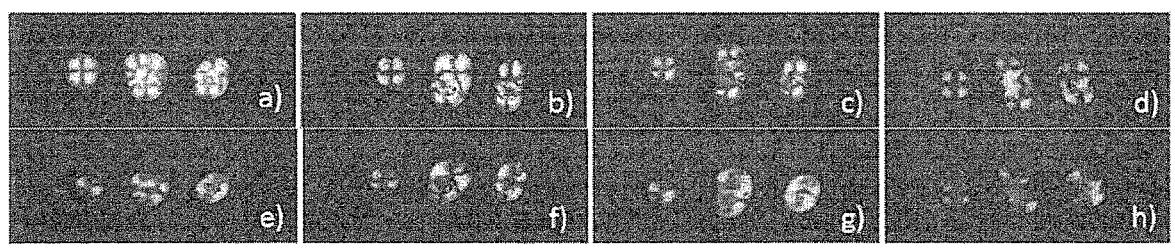

The solutions after the desired washing procedure can be dried by placing the solution in the Petri dish or coating the microscopic slide with the solution by some coating technique such as dip or spin coating. Upon drying the dispersion, the formed films show the same iridescent birefringence patterns which were found in NCC dispersions, see also FIG. 2. The average film thickness is of exemplary films is in a range from 50 nm to 500 µm, preferably from 100 nm to 30 µm. The thickness can be adjusted depending on the intended use and application.

Figure 3:
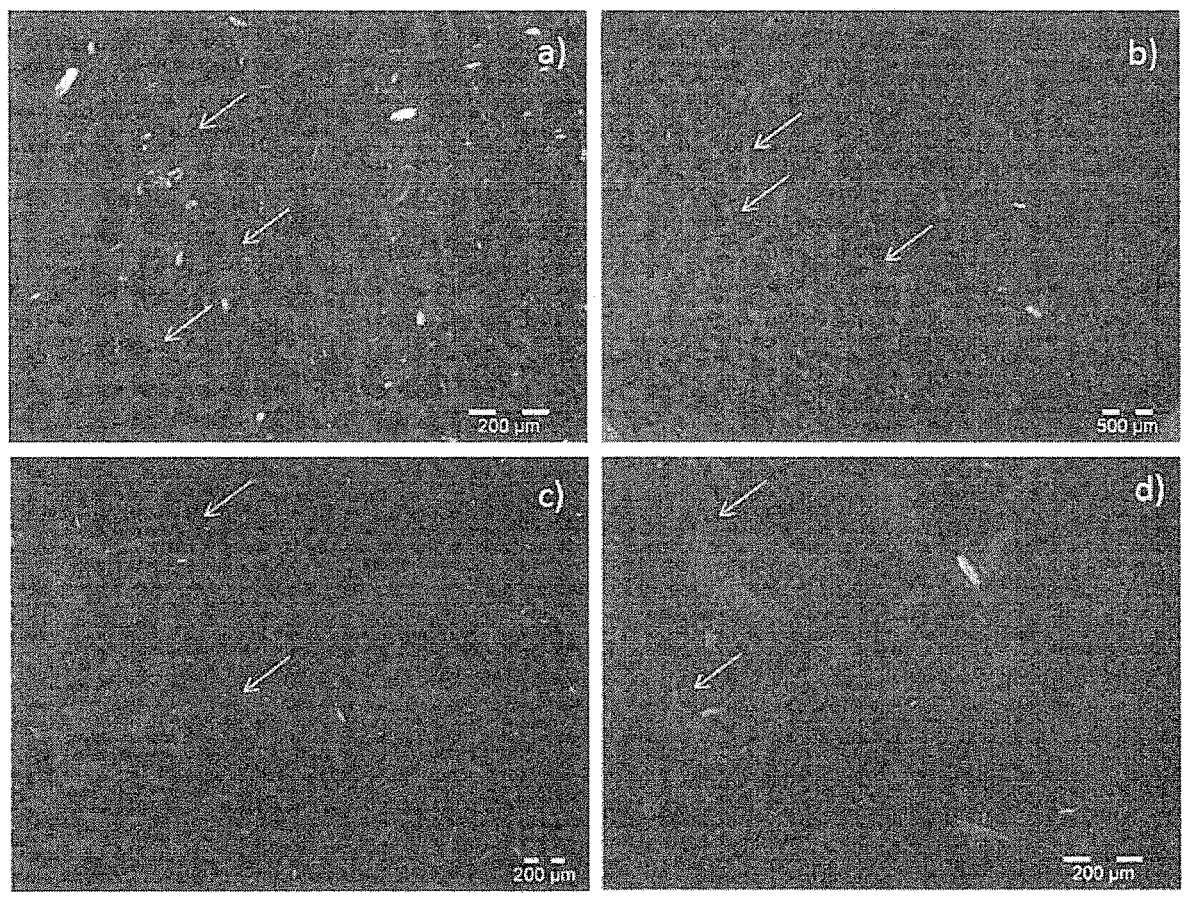

The presence of the iridescence birefringence pattern indicates that the cellulose crystals, both in the dispersion (FIG. 1) and in dried films (FIGS. 2 and 3), form a chiral nematic phase. The pitch of the chiral nematic phase is directly influenced by the presence of the ions in solution. Since the NCC fibrils ("whiskers") bear the negatively charged sulfuric esters, the presence of the cations in its surrounding packs the fibrils more closely together due to the electrostatic interactions. This behavior leads to a decrease of the pitch. However, upon subsequent repetition of the washing with water, cations are increasingly getting removed which leads to the increase of the pitch.

The change of the pitch alters the wavelength of the reflected light from shorter to longer wavelength. Therefore, a desired reflection wavelength can be adjusted by the repetition of the washing procedure. The desired wavelength can also be transferred into dried product upon subsequent drying of the dispersion or by preparation of the NCC thin films with an appropriate coating technique.

In order to confirm that the obtained films indeed have the crystalline structure X-ray diffraction measurements were carried out. The XRD diffractograms show broad diffraction peaks typical for nanocrystalline cellulose, see also FIG. 4. The broad peaks indicate the presence of crystallites in the nanometer range.

Example 2

Embodiment: Preparation of Nanocrystalline Cellulose (NCC)

In an exemplary synthesis, 2 g of cotton linters were placed in an Erlenmeyer bottle. 20 ml of 65% sulfuric acid was added to the bottle with cotton linters and everything was placed in the water bath at 60° C. and vigorously stirred for three hours. Four different temperatures, namely 45, 50, 60 and 70° C., were tested for the hydrolysis procedure. 15.15 g of NaOH were dissolved in 100 ml water. After three hours, the Erlenmeyer bottle with hydrolyzed cotton linters was removed from the water bath and 30 ml of water were added into the flask in order to adjust the viscosity of the dispersion. If necessary, such dilution step can be avoided if the base that is used is approximately diluted. In any case, the method according to the present invention does not use repeated dilution steps with water to stop the hydrolysis. In order to stop the hydrolysis, the diluted dispersion was directly mixed with NaOH solution. After the final dispersion was cooled down to the room temperature, the dispersion was transferred into centrifuge bottles and centrifuged at 4000 rpm for 15 minutes. The dispersion was separated into a transparent supernatant and a bottom jelly-like part. The transparent supernatant was decanted and the bottom jelly-like part was transferred into a glass vessel and was further washed. The washing was performed in such that the jelly-like part was transferred into a glass vessel, and 100 ml of water were added. The dispersion was left under vigorous stirring for ca. 15 min. After this, the centrifugation procedure was repeated again as described above. The whole washing process including centrifugation step was repeated 3 times.

The samples prepared at 45, 50, 60 and 70° C. show that a high yield of the NCC crystals with respect to the starting material can be achieved. This was not possible to achieve when the neutralization step had been omitted. All samples show a typical iridescence birefringence pattern when placing the bottles with samples between cross polarizers. This indicates the presence of chiral nematic ordering in the samples. Upon dilution of the samples to 3% of NCC in comparison to the dried product, the samples still kept the iridescence birefringence pattern, see also FIG. 1.

By drying a drop of each sample on microscopic glass and by placing a microscopic glass with dried NCC between the cross polarizer the iridescence pattern is still preserved. This indicates that the chiral nematic ordering remains upon drying the sample. The color of the sample changes depending on the angle of the view. When viewed at 90° C., the color is slightly blue but changes into brown-yellowish at sharper angles, see also FIG. 2. The average film thickness of exemplary films was 400 nm to 1 μm.

An investigation of the dried NCC on microscopic slides between the crossed polar filters in optical microscope shows a formation of tactoids in dried films. The tactoids are typical for liquid crystal ordering, and the presence of tactoids in dried films indicates that the chiral nematic structure is preserved, see also FIG. 3. The average film thickness of exemplary films was 400 nm to 1 μm.

In order to investigate the influence of the amount of metal ions on the formation of NCC in the chiral nematic phase, the samples were prepared in the same way as described above, but the washing and centrifugation step was repeated five times instead of three. This was performed in order to remove more ions from the solution.

Figure 4:
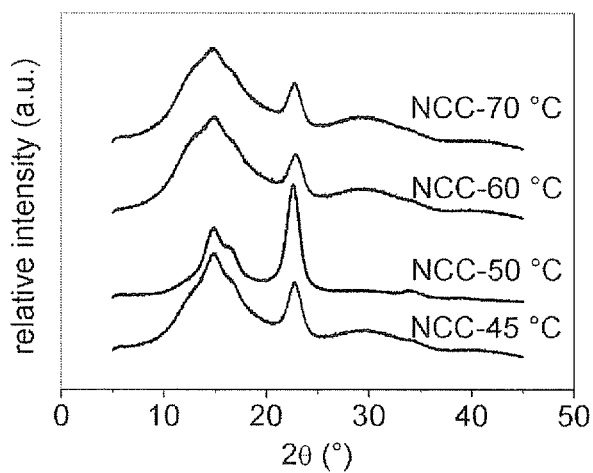

The crystallinity of the dried NCC which were washed and centrifuged five times was confirmed with XRD measurements, see also FIG. 4. The XRD measurements were performed on the dried films of NCC. The films were prepared such that dispersions which contained 3% NCC were placed in a Petri dish over night to dry. The XRD measurements were performed on the formed NCC films in the range of 5 till 45° 2θ. The XRD diffractograms showed at the presence of a broad peak positioned at 22.5° 2θ and two very close peaks at 15 and 17° 2θ. These peaks are typical for cellulose in crystalline form indicating that the samples are in nanocrystalline from. The average film thickness of exemplary films was from 15 μm to 30 μm.

The iridescent birefringence of the samples which were washed and centrifuged five times, in comparison to the samples which were washed and centrifuged only three times, was also examined. The samples after placing them into Petri dish and drying to form films preserve the chiral nematic ordering which was confirmed by placing the samples on microscopic glass slides between the cross polar filters. Samples viewed at 90° shows almost white color and upon rotation of the sample towards higher angles, the colors of the samples do not change significantly. This means that the reflection wavelength of the samples changed by increasing the frequency of the washing step in comparison to the samples which were washed only three times. This behavior is a result of the increased pitch since these NCC dispersions contain fewer ions than the NCC dispersions which were washed three times. The removal of ions is believed to lead to a less dense packing of NCC fibrils ("whiskers"). The increase in pitch as a consequence changes the wavelength of the reflected light.

The yield of the obtained NCC crystals slightly decreases with increasing the amount of washing steps. This indicates that upon removal of cations which hold the NCC crystals together, the electrostatic repulsions become predominant and lead to a stronger dispersion of NCC crystals. However, even after five times of washing it was possible to separate the NCC crystallites from the dispersion with centrifugation. In comparison, the samples which were prepared without any neutralization were impossible to separate with repeated washing and centrifugation steps.

Example 3

Preparation of Nanocrystalline Cellulose-Metal Oxide-Composite Materials and/or Preparation of Porous Metal Oxides in Accordance with Embodiments of the Present Invention According to this aspect of the present invention, it is also possible to produce a nanocrystalline cellulose-metal oxide-composite material which can subsequently be transformed into a porous oxide having a chiral nematic structure upon annealing. This can be achieved if the isolation of the nanocrystalline cellulose (NCC) and the preparation of the composite material are performed concomitantly in one pot.

Figure 5:
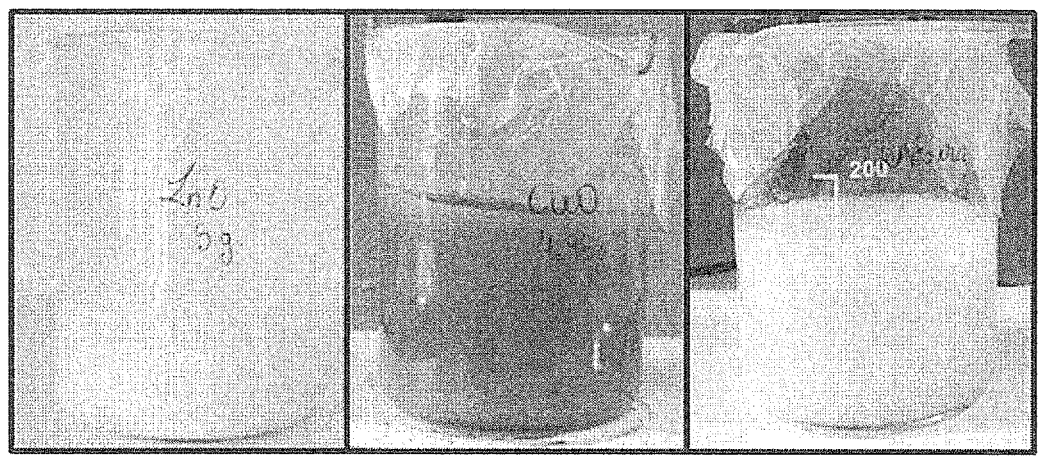

In EXAMPLES 1 and 2 above it was shown that the successful separation of NCC after the hydrolysis can be achieved by addition of a desired base at the end of the hydrolysis process to stop the hydrolysis process. This addition of a base leads to a neutralization process between the negatively charged sulfuric ions and positively charged base cations, e.g. according to the equation (when the base is MeOH)

$$2MeOH_{(aq.)} + H_2SO_{4(aq.)} \rightarrow 2Me^+ + SO_4^{2-} + H_2O \qquad \text{eq. 1}$$

and this stops the hydrolysis. Furthermore, the same neutralization reaction can be achieved by using metal oxides as a base which can react with sulfuric acid leading to the same type of the neutralization reaction according to the equation $$MeO + H_2SO_{4(aq.)} \rightarrow Me^{2+} + SO_4^{2-} + H_2O \qquad \text{eq. 2}$$

$$MeO_2 + 2H_2SO_{4(aq.)} \rightarrow Me^{4+} + 2SO_4^{2-} + 2H_2O \qquad \text{eq. 3}$$

$$Me_2O_3 + 3H_2SO_{4(aq.)} \rightarrow 2Me^{3+} + 3SO_4^{2-} + 3H_2O \qquad \text{eq. 3}$$

which also leads to the end of the hydrolysis, see also FIG. 5. In this reaction any type of metal oxide which can follow one of the above reactions or any similar neutralization reaction can be used. In an exemplary experiment the inventors used ZnO, CuO and MnO.

The nanocrystalline cellulose can be isolated using centrifugation while at the same time the mixture can also be used for the preparation of a NCC/metal oxide composite material which is subjected to further annealing and allows the preparation of metal oxide with chiral nematic structure. The amount of metal cations in this dispersion can be tuned either by decreasing the amount of metal oxide used for the neutralization or by applying one or several washing procedures. As above, the washing procedure consists of adding water to the jelly-like NCC which contains metal, agitating it for some time and repeating the centrifugation. The supernatant is discarded while the lower jelly like part which contains NCC and metal oxide precursor is collected.

Figure 10:
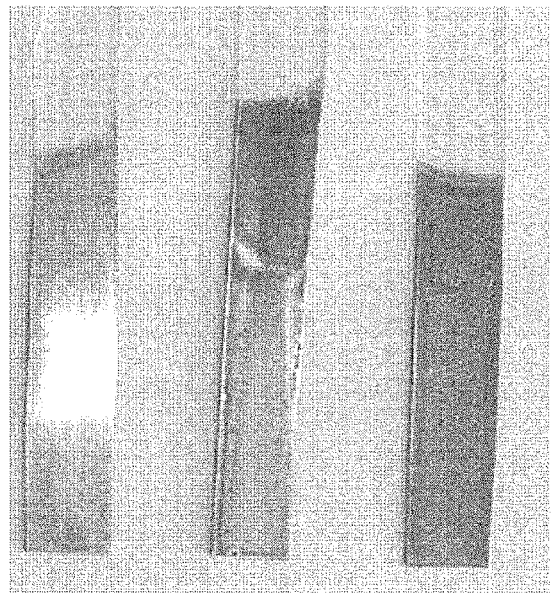

The final jelly like part can be either casted to form films having an average thickness of from 1 μm to 50 μm in one embodiment or from 15 μm to 30 μm in another embodiment (and metal oxide-NCC composites can be obtained, see also FIGS. 6, 7, 8) or further diluted to a desired concentration and used as coating material solution for the preparation of thin films on substrates, FIG. 10, with average film thicknesses of from 50 nm to 5 μm, preferably from 100 nm to 5 μm, more preferably from 400 nm to 3 μm. Microscopic images of NCC composite materials placed between cross polarized filters clearly show a preservation of the chiral nematic structure. Subsequently, both casted materials and thin films can be transferred into an oven for annealing and removal of the NCC through combustion, resulting in a porous metal oxide with chiral nematic structure.

Figure 6:
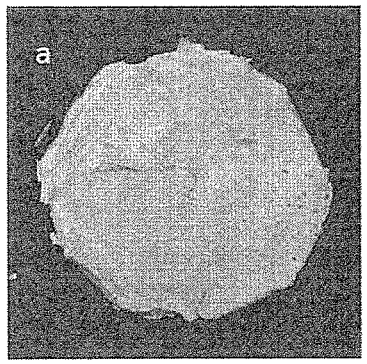
Figure 6:
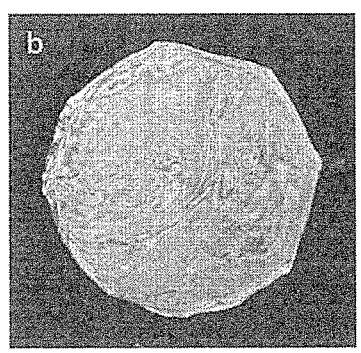
Figure 6:
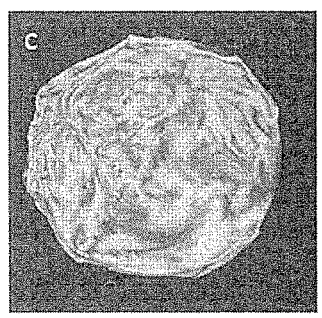
Figure 6:
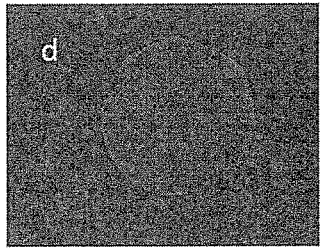
Figure 6:
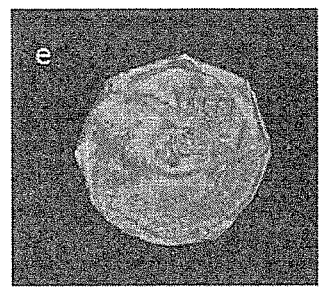
Figure 6:
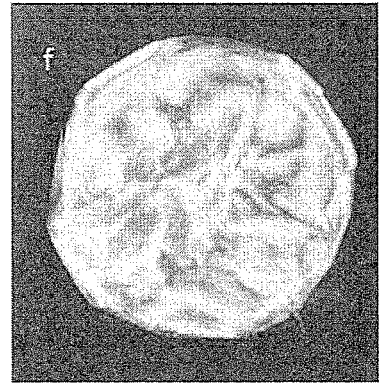
Figure 7:
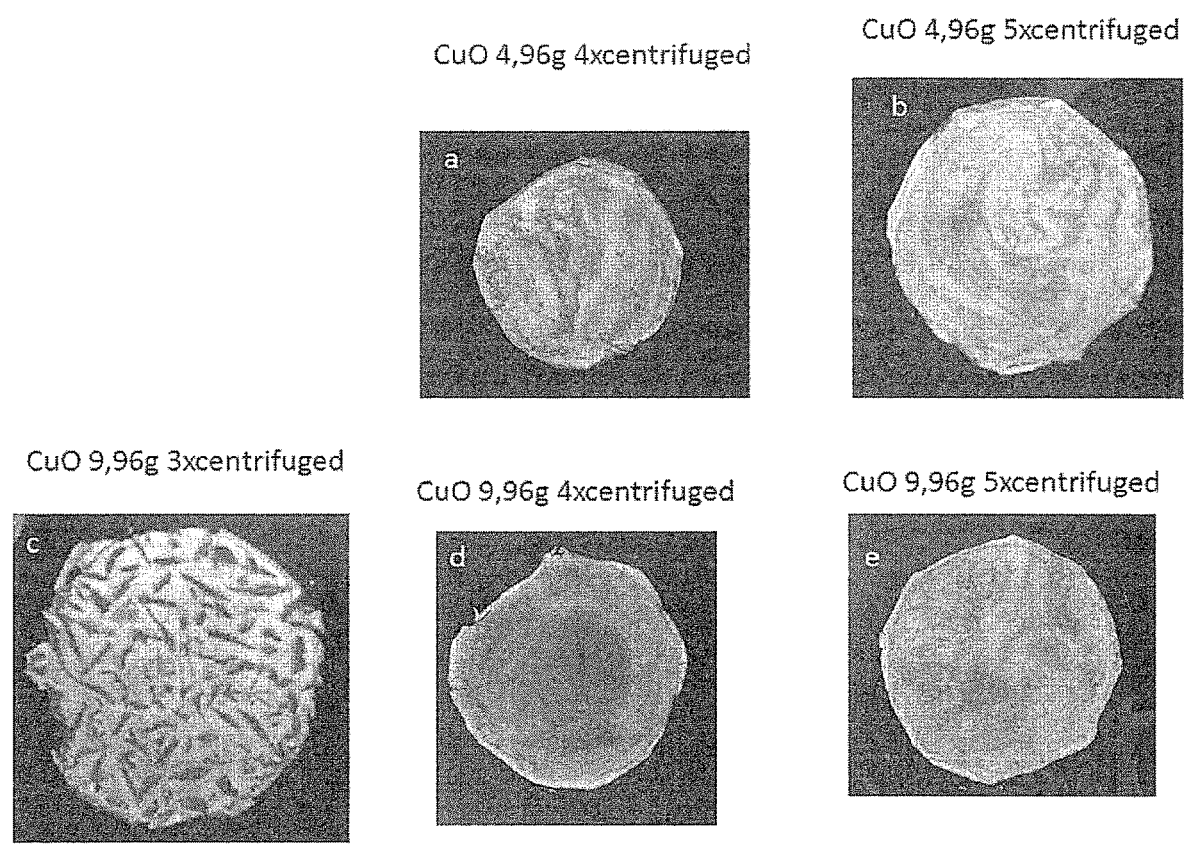
Figure 8:
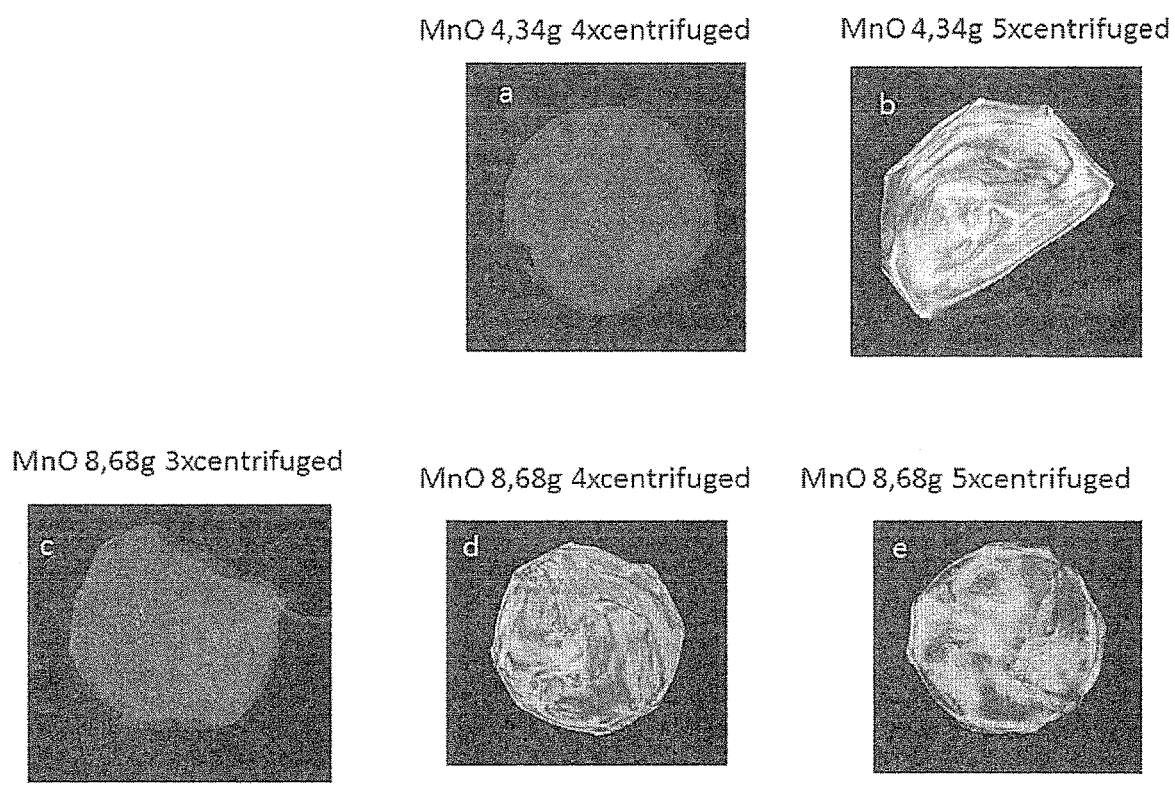

The iridescent color of the composite material can be tuned by adding various amount of metal oxide/metal hydroxide for the neutralization and by repetition of the washing procedure, see FIGS. 6, 7 and 8.

Figure 9:
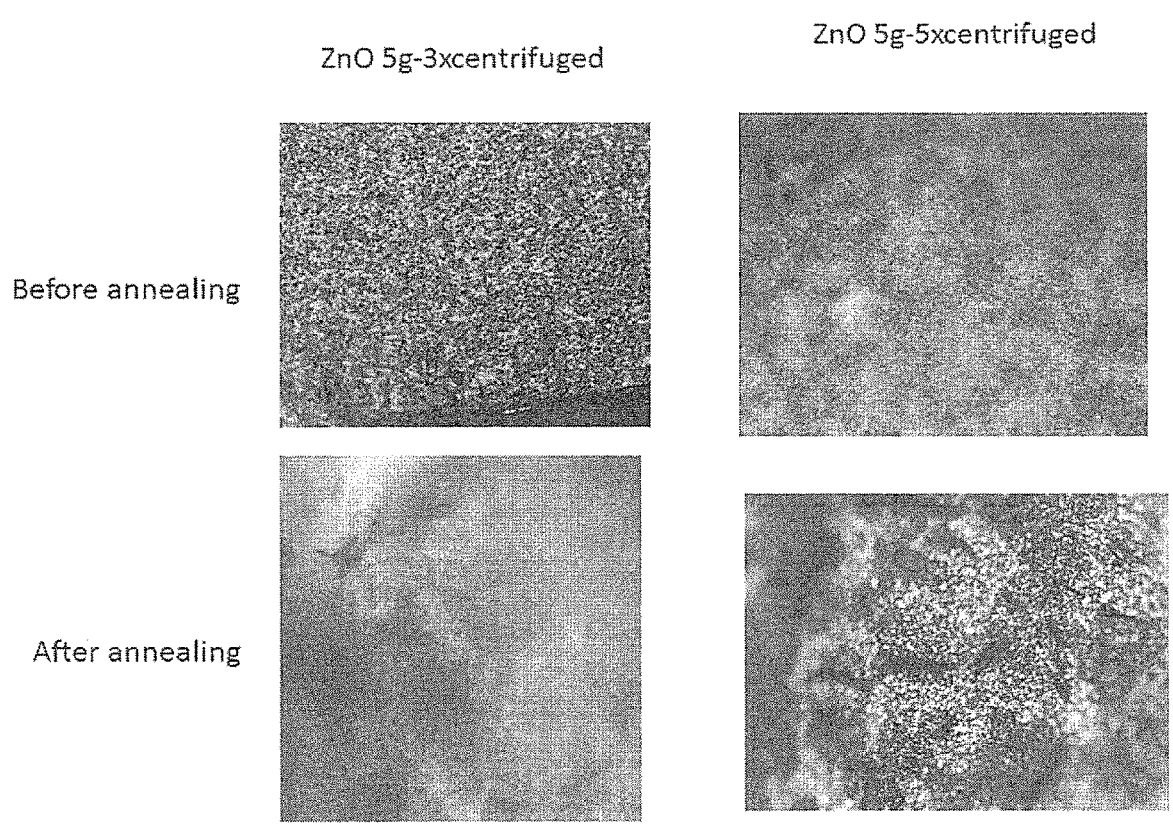

Upon coating of the glass slides with a diluted jelly like NCC solution and annealing them at 450° C. it is possible to obtain metal oxide films which differentiate in color, see FIG. 9.

Example 4

Experimental Part

The NCC was isolated from cotton linters according to the modified acid hydrolysis. In a typical reaction 20 mL of 65% sulfuric acid (0.185 mol) was added to 2 g of cotton linters. The mixture was transferred into a preheated water bath at 50° C. and vigorously stirred at 50° C. for 3 hours. After 3 hours the mixture was very viscous and had brownish color. The mixture was taken out from the heating bath and 30 mL of water was added to the mixture in order to decrease the viscosity. Subsequently, the diluted mixture was added to 100 mL of 3.7 M NaOH solution to stop the hydrolysis reaction. The amount of NaOH was calculated to correspond to the equimolar amount of hydroxyl groups required for the neutralization of hydrogen ions from sulfuric acid used in the hydrolysis. The neutralized mixture was stirred for 20 minutes and subsequently centrifuged at 4000 rpm for 15 minutes in order to separate the NCC. The supernatant was decanted and the gel-like NCC sediment was collected and further washed. The washing was performed in the way that to the gel-like sediment 100 ml of water was added, the whole mixture was stirred for 15 minutes and again centrifuged. After the third centrifugation the sediment was collected and used for further investigation.

For the neutralization with NaOH, KOH and NH4OH the same amount of the base was used for the neutralization. In the case of the oxides, in order to ensure that the whole amount of the oxides will undergo the reaction with the sulfuric acid a bit lower amount of the oxide was used for the neutralization, namely 0.150 moles.

Instrumentation

Optical microscopy was used to investigate the homogeneity of the samples and the presence of the chiral nematic ordering of NCC. The images were obtained by using Olympus BX51 microscope equipped with Olympus XC50 camera.

The mass concentration of the present ions, after the isolation procedure, was investigated by ion chromatography of the gel-like NCC sediment. For preparation 100 μl, 200 μl, 500 μl or 1 ml of the sample was diluted in 100 ml, depending on the concentration of the ions. 12 ml of this solution was used for the ion chromatography measurements. The ion chromatography measurements were performed using Metrohin 820 IC separation center with ASupp4-250 separation column for anions and C4-150 separation column for cations.

The porosity and BET surface area ("Brunauer-Emmett-Teller" surface area) of NCC template material was investigated by the analysis of adsorption isotherms of $N_2$ at 77 K using an Autosorb-iQ-MP.

The optical properties of the NCC films were investigated using UV-Vis measurements which were carried out with a Specord 50 Plus spectrophotometer in the wavelength range from 190 nm up to 1100 nm.

Calculations.

The chiral nematic structures reflect the light and the peak wavelength ($\lambda$max) reflected by chiral nematic structure depends on the refractive index (navg) of the material and the helical pitch (P) according the Vries' expression:

$$\lambda_{max} = n_{avg} P \quad (7)$$

Using the refractive index of cellulose (1.54) it is possible to calculate the helical pitch from UV-Vis spectra.

In order to estimate the mass of the dried content in the gel-like obtained product, 3 ml of the gel-like sediment were weighted ($m_s$) and left to dry in a plastic vessel. In order to ensure that the whole water evaporates from the sample ($m_{water}$), the dried samples were put into a drying oven at 50° C. for 1 h and subsequently cooled down to the room temperature before weighting. The samples were weighted before and after drying and from the mass difference the mass of the dried sample ($m_{d,s}$) was calculated according:

$$m_{d,s} = m_s - m_{water} \quad (1)$$

The mass of the hydrolyzed cellulose product ($m_{HCP}$) in dried sample was calculated using the mass of the dried sample ($m_{d,s}$) and the concentration of the ions obtained by ion chromatography measurements according to the equation $$m_{HCP} = m_{d,s} - m_s \sum_{i=0}^{n} \frac{\gamma_{ion,IC,i} V_{IC}}{m_{IC,s}} \quad (2)$$

where $m_{HCP}$ is the mass of the hydrolyzed cellulose product, $m_{d,s}$ and $m_s$ are the masses from the equation 1, $\gamma_{ion,IC,i}$ is the mass concentration of the ion i obtained through IC measurements, $V_{IC}$ is the volume of the bottle in which the sample i was diluted for the IC measurement and $m_{IC,s}$ is the mass of the pipetted gel-like NCC for the ion i in IC measurement.

The yield of the reaction was defined as:

$$\text{yield} = \frac{m_{HCP}}{m_{cotton\ linters}} \quad (3)$$

Where $m_{HCP}$ is the mass of the hydrolyzed cellulose product from equation 2 and $m_{cotton\ linters}$ is the starting mass of the cotton linters used for the hydrolysis.

Example 5

Results

Appearance of the Cellulose Nanocrystal Dispersions

Figure 11:
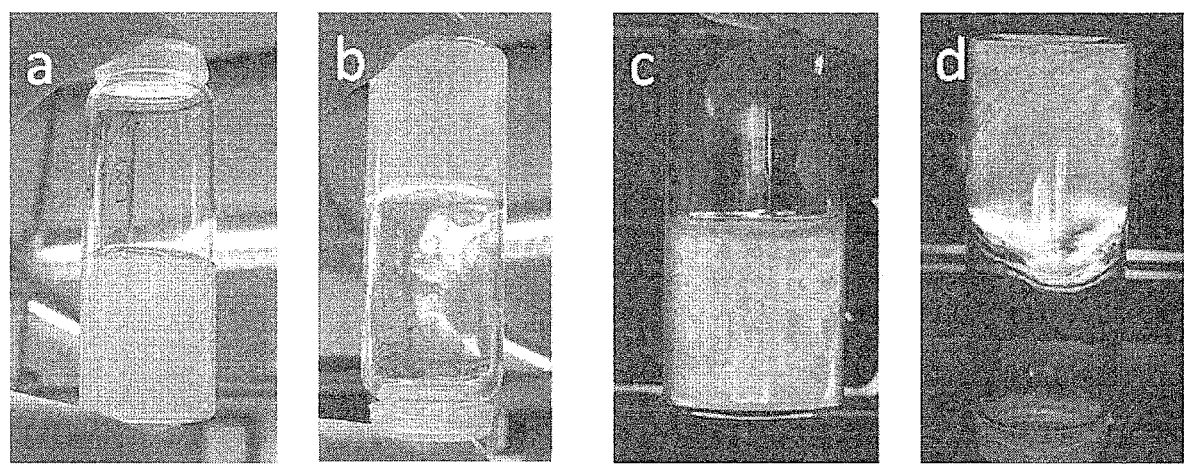

Colloidal dispersions containing ca. 3-4 wt. % of cellulose nanocrystals prepared by neutralization with NaOH have a turbid and gel-like appearance and placed between crossed polarizers show iridescence birefringence, FIG. 11.

Influence of Ions on the Isolation Process

Figure 12:
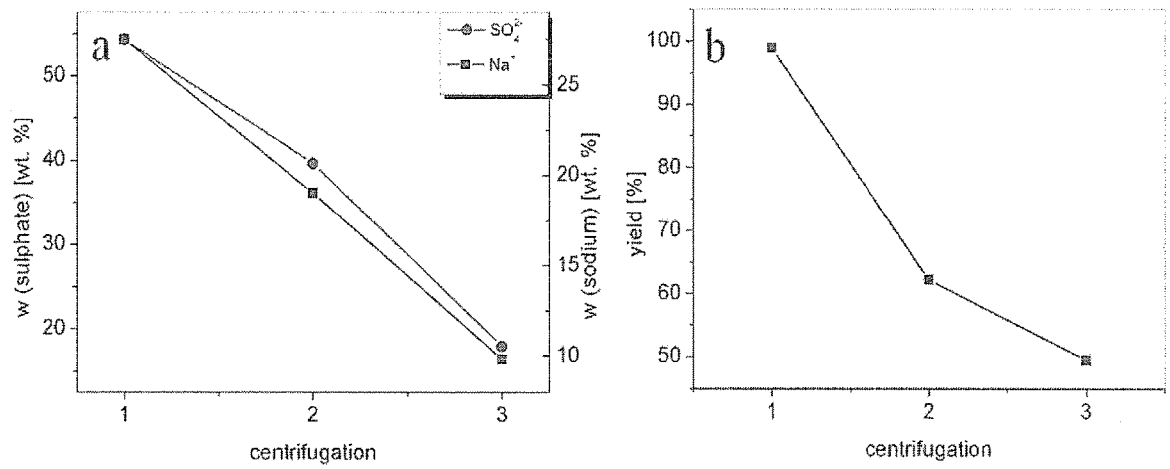
FIG. 12 shows the change of the concentration of sulfate and sodium ions upon repetition of washing and centrifugation. b Observed decrease of the yield upon repetition of washing and centrifugation. Both graphs present behavior of the sample prepared through neutralization with NaOH.

The influence of the ions on the separation of the hydrolyzed product was studied in the sample which was neutralized with NaOH. Ion chromatography measurements were performed on the sediment gel-like product which was subsequently collected after each centrifugation procedure. The ion chromatography analysis of the isolated hydrolyzed product showed that directly after the synthesis, i.e. first centrifugation, the sediment gel-like product contains high concentration of ions, FIG. 12.

The concentration of ions is gradually decreasing by repeating the washing and centrifugation procedure. After the first centrifugation the concentration of sulfate ions is 540 mg and sodium ions is 275 mg per gram of the dried sample. After the second centrifugation the concentration of ions decreases to 390 mg for sulfate and 190 mg for sodium per gram of the dried sample. Finally, after the third centrifugation the concentrations of sulfate and sodium are 179 mg and 98 mg per gram of the dried sample, respectively. Taking into account the mass fraction of the present salts in the dried samples it is possible to derive the mass of the hydrolyzed cellulose product which is present in the dried sample. It can be seen (FIG. 12b) that directly after synthesis and centrifugation a high amount of the cellulose product is obtained which corresponds to 98% of the starting mass of the cotton linters. However, one should not correlate directly this product with nanocrystalline cellulose since it would be unrealistic to expect that cotton linters contain such high portion of the crystalline phase and in the same time neglect the presence of the hydrolyzed glucose units within the sample. Upon repetition of the washing and centrifugation procedure the mass of the hydrolyzed cellulose product is decreasing to 63% and 50% of the mass of starting cotton linters for the second and third centrifugation procedure, respectively. Obviously, upon repetition of the washing and centrifugation the concentration of ions decreases but also hydrolyzed glucose parts are removed from the sediment leaving more crystalline material in the gel-like product. Further washing procedure, for the sample prepared through neutralization with NaOH, leads to the significant loss of the NCC (FIG. 13a) what can be also observed by the turbidity of the supernatant after centrifugation.

Figure 13:
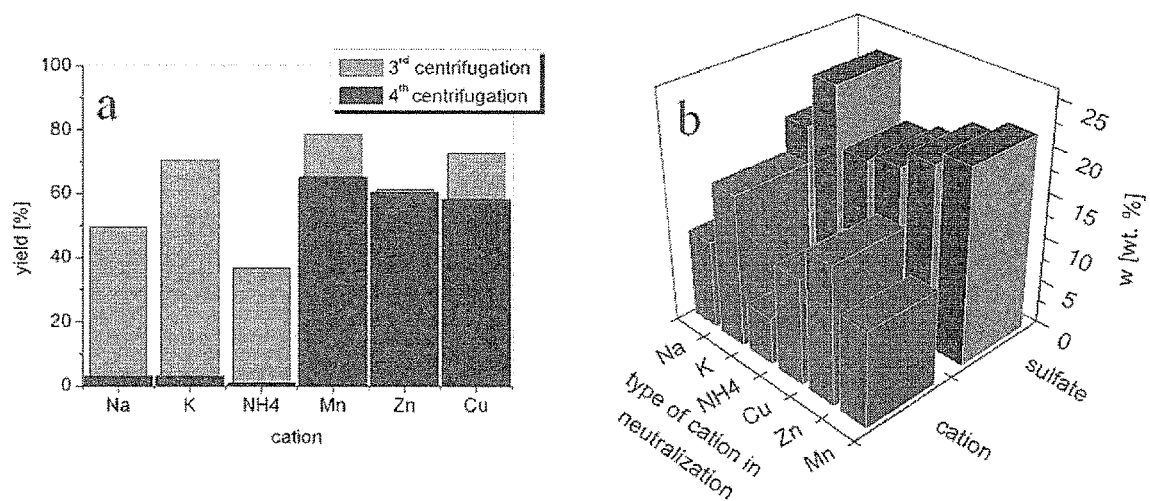
FIG. 13 shows variations in yield depending on the type of the cation used in the neutralization after repeating the washing and centrifugation for three or four times. b Variation of the concentration of sulfate and cation in the gel-like product after third centrifugation procedure for various neutralization procedures.

Obviously, the concentration of sodium ions seems to be important factor for the separation of the NCC by centrifugation since they play a role of counter ions for NCC. In other words by reaching the minimal critical concentration of cation, further dilution of the NCC dispersion diminished the effect of the Coulomb interaction between the cations and negatively charged NCC leading to increased dispersibility of NCC in solution. The amount of the isolated product after third centrifugation is strongly affected by the type of the cation that was used in the neutralization step (FIG. 13). The highest yield, in the neutralization reaction with a monovalent cation, of 70% was obtained for KOH and, in the neutralization reaction with a divalent cation, of 78% with MnO. After the fourth washing, significant product loss was observed for all used monovalent cations (FIG. 13a). On the other hand, the samples obtained by neutralization with oxides (ZnO, CuO, MnO), do not show such significant product loss upon repetition of the washing procedure for the fourth time although the mass fraction of present ions is decreasing from approximately 30 wt. % to approximately 15 wt. % of the dried product. Even though all samples were processed in the same way, the concentration of the salts present after the washing procedures differs between the samples. The presence of the lowest mass fraction of salt (23 wt. % of the dried hydrolyzed product) was obtained for the neutralization with NH$_4$OH. The highest mass fraction of the salt (42 wt. % of the dried product) was observed when the neutralization was performed with KOH (FIG. 13b). These results suggest that the type of cation used in the neutralization process, its charge density and interaction with sulfate groups, play a significant role in the isolation procedure since they are involved in the Coulomb interaction with negatively charged NCC crystallites.

Composite Films

Although the cellulose nanocrystals isolated in this way contain some amount of ions, by drying the dispersions flexible films can be obtained which between cross polarizers show a preservation of the iridescence birefringence, FIG. 14.

The UV-Vis spectra of all NCC films (NCC composites) show a broad shoulder located in the region 290 nm up to 350 nm, FIG. 15. Using the refractive index of cellulose and Vries' equation it is possible to calculate the helical pitch from UV-Vis spectra. We found that the pitch of our composite materials, calculated from the shoulder observed in UV-Vis spectrum is between 190 nm for Mn-NCC and 212 nm for K-NCC composite film, respectively.

The isolated cellulose nanocrystals can be successfully used as a template material for the preparation of porous oxides. For these purposes we have prepared a silica-NCC composite material by mixing an end gel-like product obtained through neutralization with NaOH and a tetraethylorthosilicate (TEOS). Upon drying and annealing such composite material at 500° C. a porous oxide can be formed. The adsorption measurement of $N_2$ on such material shows type IV isotherms typical for mesoporous material with a pore size distribution around 10 nm and BET area of 110 $m^2/g$, FIG. 16.

The features of the present invention disclosed in the specification, the claims, and/or in the accompanying drawings may, both separately and in combination thereof, be material for realizing the invention in various forms thereof.

The invention claimed is:

1. A method of preparing nanocrystalline cellulose, comprising the steps:
   a) providing cellulose fibers,
   b) subjecting said cellulose fibers to an acidic hydrolysis,
   c) stopping the hydrolysis by direct addition of a base, without any intervening washing steps before addition of said base,
   wherein step c) does not lead to a formation of insoluble sulfate or a precipitation of sulfate, and
   wherein said base that is added in step c) is selected from the group consisting of metal hydroxides, metal oxides and $NH_3$.

2. The method according to claim 1, comprising the further step:
   d) isolating the nanocrystalline cellulose resulting from the performance of steps b)-c).

3. The method according to claim 2, wherein isolating the nanocrystalline cellulose in step d) is achieved by centrifugation and washing.

4. The method according to claim 3, wherein step d) is achieved by performing a first centrifugation on the product of step c), followed by a washing step and a further centrifugation step.

5. The method according to claim 4, wherein the washing step and the further centrifugation step are performed n-times, wherein n=1-10.

6. The method according to claim 1, wherein said hydrolysis in step b) is performed by the presence of a mineral acid.

7. The method according to claim 1, wherein said hydrolysis in step b) is performed by the presence of a mineral acid, and wherein said base is
   i) a metal hydroxide or $NH_3$, and wherein said metal hydroxide or $NH_3$ is added in step c) in a molar ratio of base:mineral acid in a range of from 1:5 to 5:1, or
   ii) a metal oxide, wherein said metal oxide in step c) is added in a molar ratio of metal oxide:mineral acid in a range of from approximately 1:10 to 1:1.

8. The method according to claim 1, wherein said metal hydroxide is an alkali metal hydroxide or an earth alkali metal hydroxide or a metal hydroxide selected from $Al(OH)_3$, $Zn(OH)_2$, $Mn(OH)_2$ and $Cu(OH)_2$, and wherein said metal oxide has a general formula selected from MeO, $MeO_2$ and $Me_2O_3$, wherein Me=metal and O=oxygen.

9. A method for preparing a porous metal oxide with chiral nematic structure, comprising the steps:
   a') performing the method according to claim 1, wherein the base that is used is a metal oxide or a metal hydroxide,
   b') casting the resultant nanocrystalline cellulose in a three-dimensional shape or as a thin film, wherein said thin film has a thickness in the range of from 50 μm to 500 μm, and
   c') subjecting said casted shape or thin film to a heat treatment for annealing and for removal of the nanocrystalline cellulose, said heat treatment thus resulting in a porous metal oxide with chiral nematic structure.

10. The method, according to claim 6, wherein the mineral acid is sulfuric acid.

11. The method, according to claim 7, wherein (i) said metal hydroxide or $NH_3$ is added in step c) in a molar ratio of base:mineral acid in a range of from 1:2 to 2, or ii) a metal oxide, wherein said metal oxide in step c) is added in a molar ratio of metal oxide:mineral acid in a range of from approximately 1:3 to 1:1.

12. The method, according to claim 9, wherein said thin film has a thickness in the range of from 100 nm to 30 μm.

* * * * *

UNITED STATES PATENT AND TRADEMARK OFFICE
CERTIFICATE OF CORRECTION

PATENT NO. : 10,875,934 B2
APPLICATION NO. : 15/517779
DATED : December 29, 2020
INVENTOR(S) : Vesna Müller and Heiko Briesen It is certified that error appears in the above-identified patent and that said Letters Patent is hereby corrected as shown below:

In the Specification

<u>Column 14,</u>
Line 61 "Metrohin 820 IC" should read --Metrohm 820 IC--.

In the Claims

<u>Column 18,</u>
Lines 35-36 Claim 9, "50 µm to 500 µm," should read --50 nm to 500 µm,--.
Line 45 Claim 11, "1:2 to 2, or ii)" should read --1:2 to 2:1, or ii)--.

Signed and Sealed this
Third Day of August, 2021

Drew Hirshfeld
*Performing the Functions and Duties of the
Under Secretary of Commerce for Intellectual Property and
Director of the United States Patent and Trademark Office*